United States Patent [19]

Trethowan

[11] Patent Number: 5,127,811
[45] Date of Patent: Jul. 7, 1992

[54] BLADDERLESS TYPE MOULDING APPARATUS

[75] Inventor: Jack Trethowan, Birmingham, United Kingdom

[73] Assignee: Kabushiki Kaisha Kobe Seiko Sho, Kobe, Japan; a part interest

[21] Appl. No.: 431,393

[22] Filed: Nov. 3, 1989

[30] Foreign Application Priority Data

Nov. 7, 1988 [GB] United Kingdom ............... 8826013

[51] Int. Cl.⁵ ............................................. B29C 35/02
[52] U.S. Cl. ..................................... 425/32; 425/36; 425/38; 425/46; 425/47; 425/49; 425/56; 425/57
[58] Field of Search .................. 425/36, 44, 46, 54, 425/55, 56, 57, 32, 38, 49, 51, 47, 28.1, 32; 279/2; 156/417

[56] References Cited

U.S. PATENT DOCUMENTS

| | | | |
|---|---|---|---|
| 1,704,440 | 3/1929 | Little | 156/417 |
| 2,904,832 | 9/1959 | Frohlich et al. | 425/35 |
| 2,939,175 | 6/1960 | Frohlich et al. | 425/35 |
| 2,959,815 | 11/1960 | Brundage | 425/35 |
| 3,153,263 | 10/1964 | Mallory et al. | 425/35 |
| 4,154,790 | 5/1979 | Allitt | 425/36 |
| 4,582,470 | 4/1986 | Sarumaru | 425/32 |
| 4,768,937 | 9/1988 | Singh | 425/36 |
| 4,772,351 | 9/1988 | Thompson et al. | 156/417 |

FOREIGN PATENT DOCUMENTS

| | | | |
|---|---|---|---|
| 846443 | 4/1961 | United Kingdom . | |
| 864443 | 4/1961 | United Kingdom | 425/36 |
| 869902 | 6/1961 | United Kingdom . | |
| 1191937 | 5/1970 | United Kingdom | 425/36 |

Primary Examiner—Jay H. Woo
Assistant Examiner—J. F. Durkin
Attorney, Agent, or Firm—Oblon, Spivak, McClelland, Maier & Neustadt

[57] ABSTRACT

A bladderless tire mold press for tires including lower and upper platens and a mechanism for moving the platens relatively toward one another from an open position to a closed molding position. Each of the platens includes side wall molds for molding the tire sidewalls and thread molds for molding the tire thread. Each of the platens further includes a mechanism for molding tire beads. The tire bead molding mechanism including central mechanisms which are movable relative to their respective platens for insertion into the center of the tire.

5 Claims, 13 Drawing Sheets

BLADDERLESS TYPE MOULDING APPARATUS

The present invention relates to a bladderless tire molding apparatus and method of operating the same.

In conventional tire technology, a so called "green" tire is produced which is generally similar to the final shape of the tire, the green tire then being loaded into a tire molding press which includes a mold for curing the "green" tire; that is, completing the cross-linking of the polymer of the "green" tire. The mold includes surfaces, for example, to produce the tread on the tire, and the tire is pressed against the mold surfaces by means of an internal bladder passed into the green tire and through which the curing medium (which is usually steam or hot water) passes. The use of bladders in such mold presses is substantially universal, because it makes the problem of sealing to retain the curing and preshaping medium simpler. However, the bladders are subject to wear and there are other difficulties. In particular, the uneven nature of the bladder can distort the tire during shaping, and affect its position in the mold, thus resulting in {serious quality problems relating to uniformity and performance standards, all of these being major factors in determining the market acceptance of the tire.

Other advantages of eliminating the bladder is the higher heat transfer rate (from the curing medium to the tire) which results in shorter cure times, and eliminates the press down time to change bladders. Consequently, this may reduce the number of extremely expensive molding presses and molds that are required.

Bladderless molding will also result in significant reduction in operating costs due to the elimination of the bladder costs, the elimination of the green tire inside painting operation, and in energy saving.

A further quality advantage is that the ridges imparted to the inside of the tire by the bladder vent grooving will be eliminated, thus avoiding possible local distortion of the tire ply cords.

A number of proposals have been made to remove the bladder and to produce a bladderless tire mold press, but despite these proposals, bladderless tire mold presses are rare or unknown in a factory environment for the large scale production of tires.

The tire molding press to be described includes a lower platen, an upper platen, and means for moving them relatively towards one another to a molding position. The upper and lower platen mount means to mold the tire side walls and means to mold the tire tread. In the arrangement to be described the tread mold is provided by separate tread molding pieces mounted on the lower platen and means may be provided to move the tread molding pieces towards and away from a molding position.

The means for moving the upper platen may be attached to a fixed beam positioned over the bottom platen and the upper platen may move vertically up and down and may be accurately positioned by means of linear guides forming part of the press side frames or columns.

In the press to be described, each of the lower and upper platens mount a central means which may be inserted into the center of a green tire, each of which central means includes a tire bead molding means, means to expand the bead molding from a first diameter less than the inner circumference of the green tire, to a larger diameter in which the bead molding means forms an annular ring for molding the bead of the green tire.

In the preferred arrangement, the bead molding means sealingly engage with the green tire so that a curing agent such as hot water or steam may be passed directly into the interior of the green tire to cure the green tire, pressure being applied by the curing agent to force the green tire into engagement with the surrounding mold parts to mold the outer surface of the green tire and to seal the green tire bead against the bead ring which will mold the outside surface of the tire bead.

The tire bead molding means may comprise a plurality of sectors which, in the expanded position of the bead molding means engage with one another to provide a molding surface for molding the inside surface of the bead of the tire.

BRIEF DESCRIPTION OF THE DRAWINGS

A bladderless tire mold press will now be described by way of example only and with reference to the accompanying drawings in which.

DESCRIPTION OF THE PREFERRED EMBODIMENTS

The tire mold press of the invention may conveniently be used with a tread mold system of the type disclosed in our copending British patent application No. 8826012.0 and entitled "Tread Mould for a Tyre Mould Press and with an unloader unit of the type disclosed in our copending British patent application No. 8826011.2 and entitled "Apparatus for Unloading A Tyre from a Tyre Moulding Press" and with a cooling unit of the type disclosed in our copending British patent application No. 8826010.04 and entitled "Cooling Apparatus" and details of those three patent applications are incorporated herein by reference.

Figure 1A:
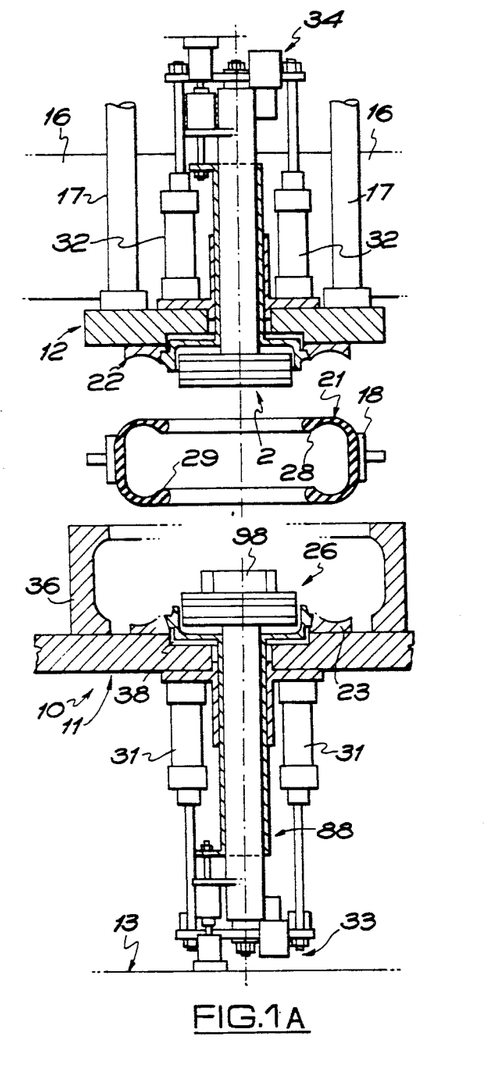
FIGS. 1A to 1D show diagrammatic vertical sections through a press according to the invention showing the press in a sequence of positions during closure of the press.

Referring to FIGS. 1A to 1D there is shown a tire mold press 10 comprising a lower platen 11 and an upper platen 12. The lower platen 11 is mounted to the ground 13 by a frame, not shown. The upper platen 12 is mounted to an upper beam 16 and is moveable up and down with respect to the beam 16 by means of hydraulic rams 17. (Screw type actuators may be used in place of rams 17 and other rams to be described.) A loader mechanism 18 is provided to be movable into a position between the lower and upper platen when the upper platen is raised as shown in FIG. 1A. In FIG. 2D, an unloader 19 is illustrated in a similar position to that of the loader 18, the unloader 19 being removable from the position between the lower and upper platens.

The loader 18 mounts a so-called green tire 21 in FIG. 1A, the green tire being a tire which is formed of uncured or part-cured material.

The lower surface of the upper platen 12 incorporates a side wall mold 22 for molding the side walls of the tire and the upper surface of the lower platen 11 incorporates a similar side wall mold 23. Each of the lower and upper platens mount a respective center mechanism 26, 27, the primary purpose of each of which is to engage, seal, and mold the inner circumferential edge (referred to as the "bead" 28, 29 respectively) of the green tire. Movement of each center mechanism 26, 27 axially with respect to their respective platens is controlled by means of hydraulic ram systems 31, 32 respectively. (Rams 31, 32 could be replaced by screw actuators.)

Lower platen 11 also movably mounts a segmental tread mold means 36.

There is also provided rotary actuators 33, 34 for rotating relevant parts of the respective center mechanisms 26, 27 for purposes which will be described later.

The center mechanisms 26, 27 each comprise two parts 37, 38, part 37 being adapted to engage the inside of the respective bead 28, 29 when expanded, and part 38 being arranged to engage the outside of the respective bead 28, 29.

Operation of these parts will now be described.

FIGS. 1A to 1D show closure of the press 10 and FIGS. 2A to 2D show opening of the press.

Figure 1B:
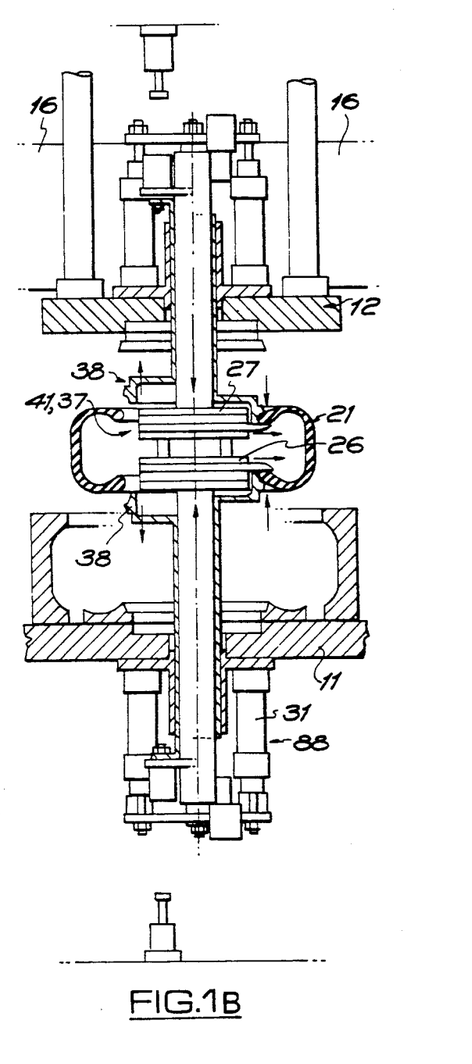

Referring firstly to FIGS. 1A to 1D and in particular, FIG. 1A, the tire press 10 is arranged so that the upper platen 12 is withdrawn upwardly to the maximum extent from the lower platen 11. The loader 18 may then load a green tire 21 into the "loading" position shown. As shown in FIG. 1B, the center mechanisms 26, 27 are then moved by hydraulic rams 31, 32 towards one another, meeting in the loading position.

Although the process will be described in more detail later, each center mechanism 26 is then operated to engage and grip its respective bead 28, 29 of the green tire. This is done by expanding the parts 37 of the center mechanisms 26, 27 and moving upwardly and downwardly annular bead mold parts 38 of respective center mechanisms 26, 27. In this way, the green tire 21 can be supported on the two center mechanisms 26, 27 and due to the force exerted by the parts 37 the tire beads clamped and sealed against the bead rings 38, which will enable a low internal pressure to be applied, such as a first stage shaping operation, without risk of pulling the ply cords around the tire bead coils. This arrangement will also ensure that both beads are accurately positioned and that the tire treatment is symetrical. The parts 37, 38 each include bead molding sections so that the beads 28, 29 of the green tire can be molded.

Figure 1C:
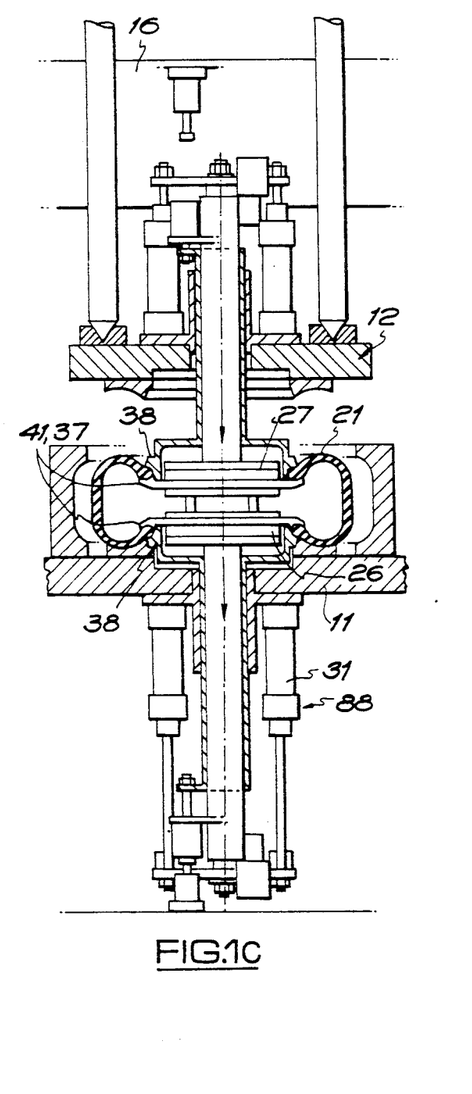

The loader 18 is then disengaged from the green tire 21 and the center mechanisms 26, 27 and upper platen 12 move down together until the green tire 21 is in its molding position shown in FIG. 1C, in which the lower side wall of the green tire 21 engages with the side wall mold 23.

Then the upper platen 12 is moved down so that the side wall mold 22 engages the side wall of the green tire 21 and the tread mold means 36 are moved into engagement with the green tire 21.

In this position, it will be seen that the outer surfaces of the green tire 21 is entirely surrounded by molding surfaces comprising tread mold means 36, side wall molds 22, 23, and bead molds formed by the parts 37, 38. Furthermore, the parts 37, 38 sealingly engage with the bead of the green tire 21 and so in the position of FIG. 1D, a curing medium can be passed to the interior of the green tire 21.

Figure 1D:
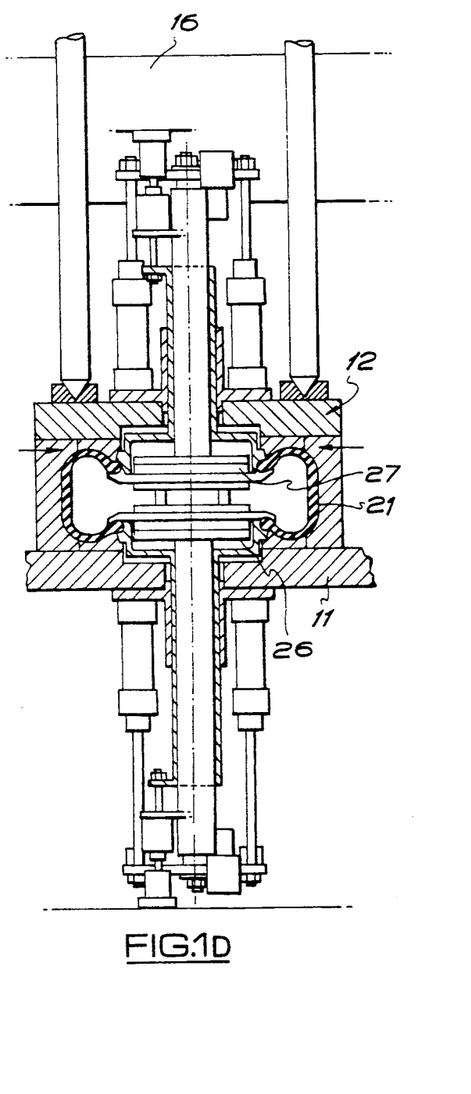

It is not necessary to provide a bladder since, the tire is sealingly engaged with the parts 37, 38 of the center mechanisms 26, 27 and so, in the position shown in FIG. 1D, the curing medium which may be steam or hot water or a mixture of both under pressure is applied directly to the inside of the tire. The effect of this is to expand the tire so as to properly engage with the various molds surrounding it, and thereafter to cure the tire.

When the curing medium has been applied for a sufficient length of time for the green tire 21 to be cured, (which varies from, say, 8-12 minutes for car tires to about 60 minutes for truck tires) the curing medium is removed and if that is steam, then it is simply a matter of shutting off the steam supply, and exhausting the inside of the tire to atmosphere. To open the tire mold press from the position shown in FIG. 2A, which corresponds to that in FIG. 1D, the segmental tread mold means 36 are withdrawn and the upper platen 12 and the center mechanisms 26, 27 are lifted to the position shown in FIG. 2B.

With bladderless curing it will be necessary to remove any residual condensate or hot water remaining inside the tire after the curing medium has been exhausted.

Figure 2A:
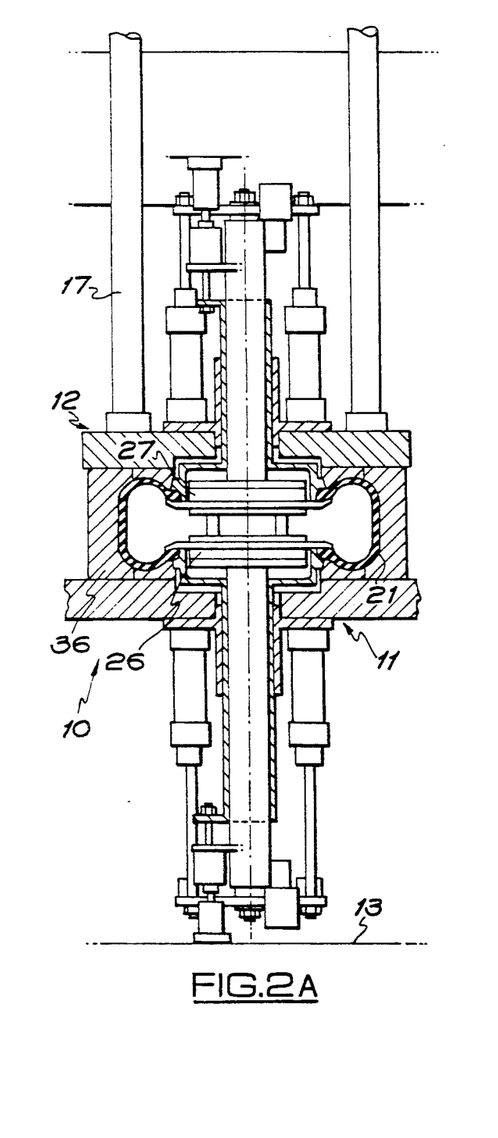
FIGS. 2A to 2D show diagrammatic vertical sections through a press according to the invention showing the press in a sequence of positions during opening of the press.

It may be the possible of to achieve this in position FIG. 2A by reducing the pressure inside the tire to below atmospheric pressure, and so causing any residual water to be flashed off as steam.

Figure 2B:
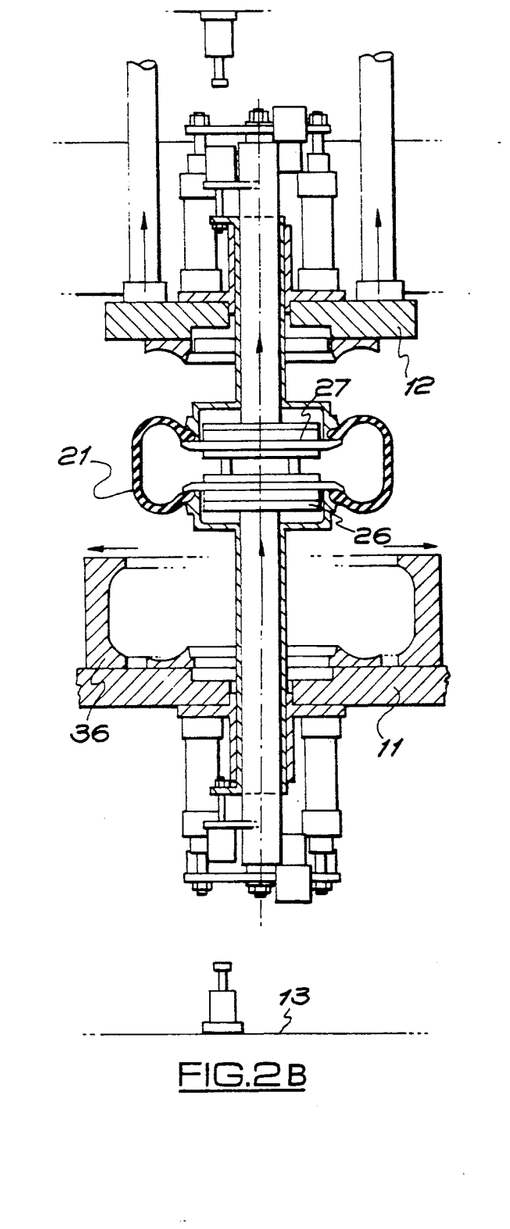
Figure 2C:
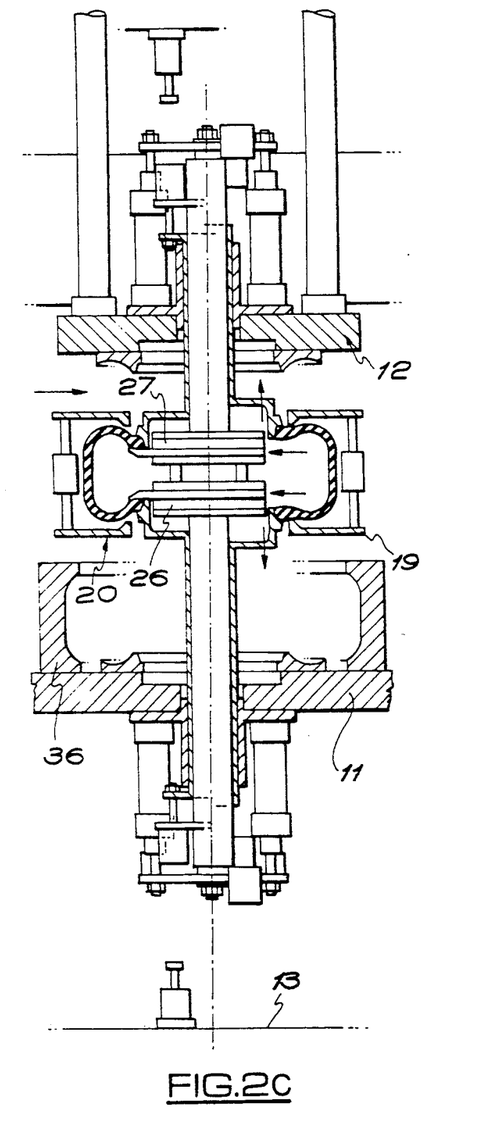
Figure 2D:
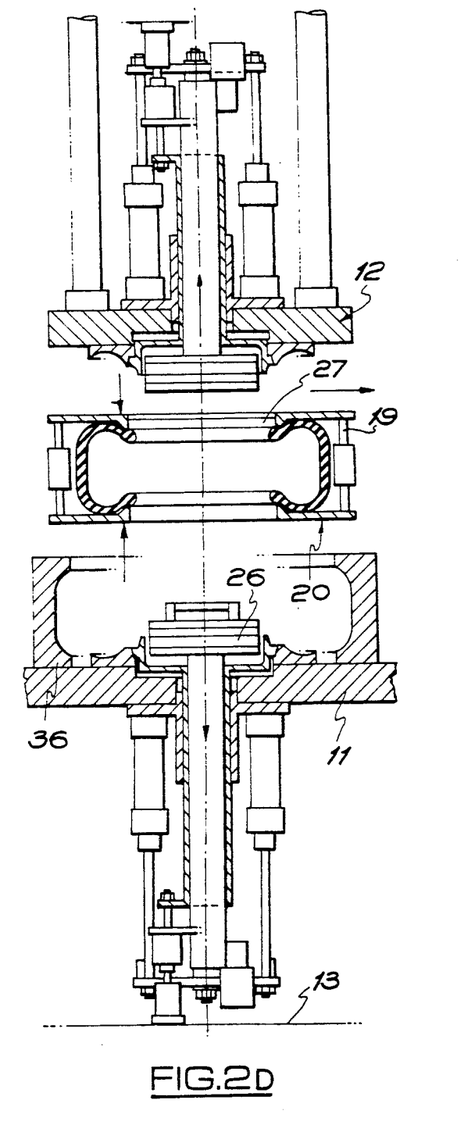

Alternatively this may be carried out in the position of FIG. 2B by either of the following sequences:
i) Withdraw the bottom bead ring 38 together with tire bead 29 until it is lower than the tire sidewall in which case the residual water will flow out through the center mechanism 26.
ii) If the tire does not consistently stick to the bead ring then the following alternative sequence may be used:
   a) Withdraw the bottom bead ring 38 slightly and partly retract the bottom bead plate 37 so as to create openings through which water may escape.
   b) close the bead ring 38 to re-clamp the tire bead.

c) partially lower the bottom center mechanism 26, to open the tire so that the distance between the beads is wider than the width of the tire.

d) the water should then flow out through the openings created by the partially retracted sectors of the sector plate 37.

e) the lower center mechanism is then raised to enable the unloader to be placed into position as shown in FIG. 2C.

An alternative method is to remove the water after the tire has been removed from the press by making use of the features provided by our copending British Patent application No. 8826011.2.

Because of the considerable compression forces created between the tire bead and mold parts 37, 38, it is sometimes difficult to dislodge the tire, and this results in the tire bead becoming kinked following which the tire must be scrapped or downgraded. Any straining of the tire bead is undesirable.

Referring to FIG. 2C, it will be seen that the unloader 19 is moved into position around the tire, and that the gripper segments 20 (approx 200°) will be closed until they nearly contact the tire adjacent to the beads 28,29.

In this position the annular parts 38 of the center mechanism may be withdrawn. If they cannot overcome the force causing the tire to stick, then parts 38 will pull and hold the tire against the unloader segments. This will enable the sectors 37 to be retracted.

The center mechanism 26, 27 can then be withdrawn, and if necessary this will increase the force acting on parts 38 to ensure that they overcome any undue tire sticking forces. The tire will now be retained and held by the gripper segments 20 of the unloader 19.

The tire has now been disengaged from all parts of the mold as shown in FIG. 2D and may be removed by means of the unloader 19.

We now refer to FIGS. 3 to 9 which give details of the part 37 of the center mechanisms 26, 27 which engage with the inside surface of the bead 28, 29 of the tire.

Figure 3:
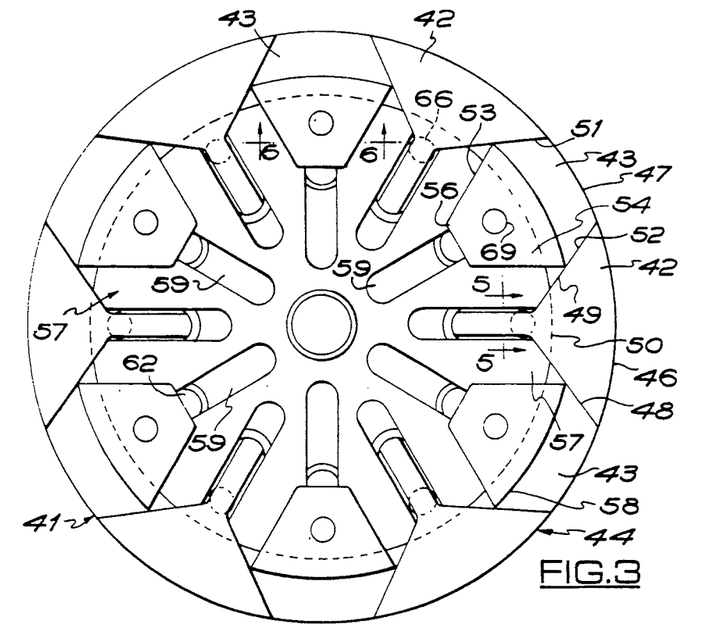
FIG. 3 shows a plan view of a sector plate forming a part of a center mechanism of the tire press, with the sectors of the sector plate expanded.

The part 37 comprises a sector plate 41, and a plan view of a sector plate 41 is shown in FIG. 3. The sector plate 41 comprise two sets of sectors 42 and 43. The sectors 42, 43 are arranged alternately and when the sectors 42, 43 are expanded as in FIG. 3, the peripheral edges 46, 47 of the sectors 42, 43 form a circle 44. The sector plate 41 illustrated is the lower sector plate mounted to the lower platen 11 but the other top sector plate is the same.

Referring to the sectors 42, it will be seen that in addition to an arcuate edge 46, each plate includes two straight edges 48, 49 each of which extend from the peripheral edge 46 towards one another and rearward end 50 so that the overall plan shape of the sectors 42 are approximately segmental.

Sectors 43 have two straight edges 51, 52 extending away from a peripheral edge 47, and parallel to adjacent straight edges 48 or 49 of adjacent sectors 42, and two further straight edges extending from the rear end of the straight edges 51, 52, the further straight edges 53,54 extending generally towards one another rearwardly form the respective straight edges 51 or 52 to a rearward end 56.

The straight edges 48, 49 of the sector 42 include grooves 63, and the straight edges 51, 52 of the sectors 43 include outwardly directed tongues 64 which engage in the groove 63 of the adjacent sectors 42.

Mounted below the plane of the sectors 42, 43 is a mounting plate 57 (see FIGS. 5 and 6), the mounting plate 57 being circular, the outer periphery 58 of which is coaxial with, but of lesser radius than the circle 44. The plate 57 incorporates in its top surface a radial 'T' section slot 59 for each of the sectors 42 and 43.

It will be seen from FIGS. 5 and 6 that each of the sectors 42, 43 includes, below the upper plate surface, a T-Section tongue 62 which engages in the T-Section slot 59.

Figure 7:
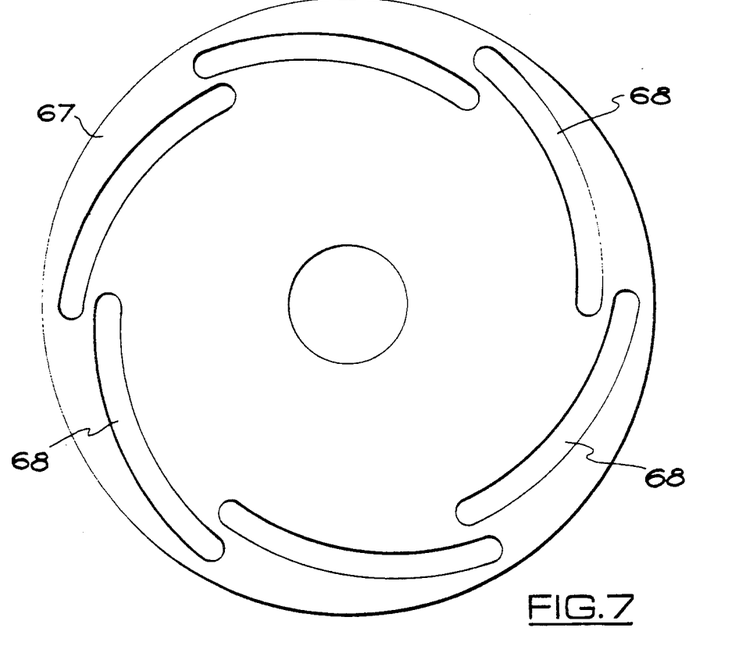
FIG. 7 is a view of an upper surface of a first, lower, cam plate.

In the case of the sector 42, a cam follower 66 is provided which downwardly extends from the tongue 62. Below the mounting plate 57 there is mounted a cam plate 67 the upper surface of which is illustrated in FIG. 7, the cam plate 67 including cam grooves 68 into which the cam followers 66 extend.

Figure 8:
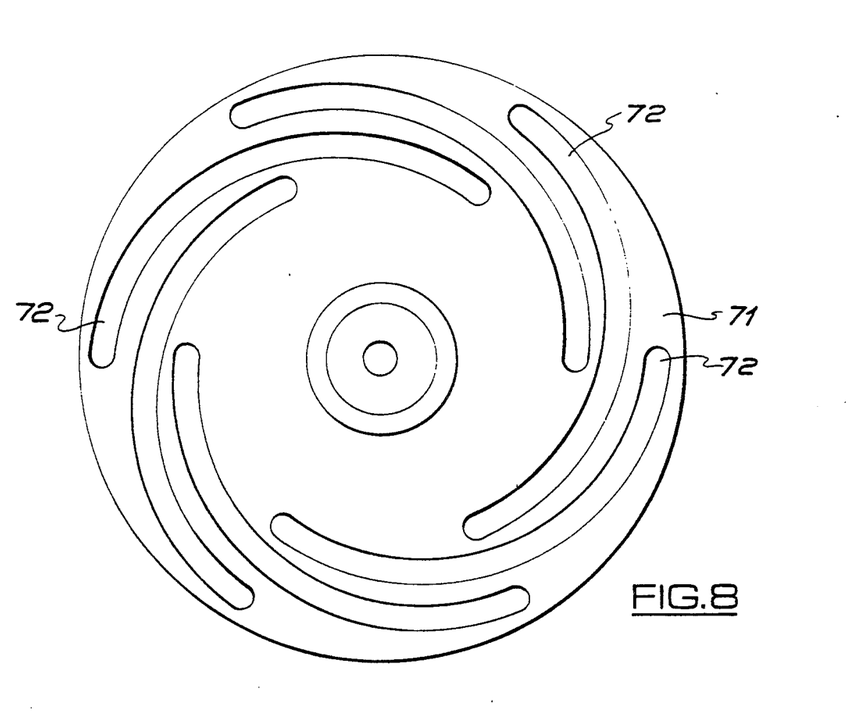
FIG. 8 an under view of the undersurface of a second, upper, cam plate.

In the case of the sectors 43, each sector 43 includes an upwardly extending cam follower 69 and above the sector plate 41 there is mounted a second cam plate 71 illustrated in FIG. 8 including cam grooves 72, each cam follower 69 engaging in a respective cam groove 72.

Figure 9:
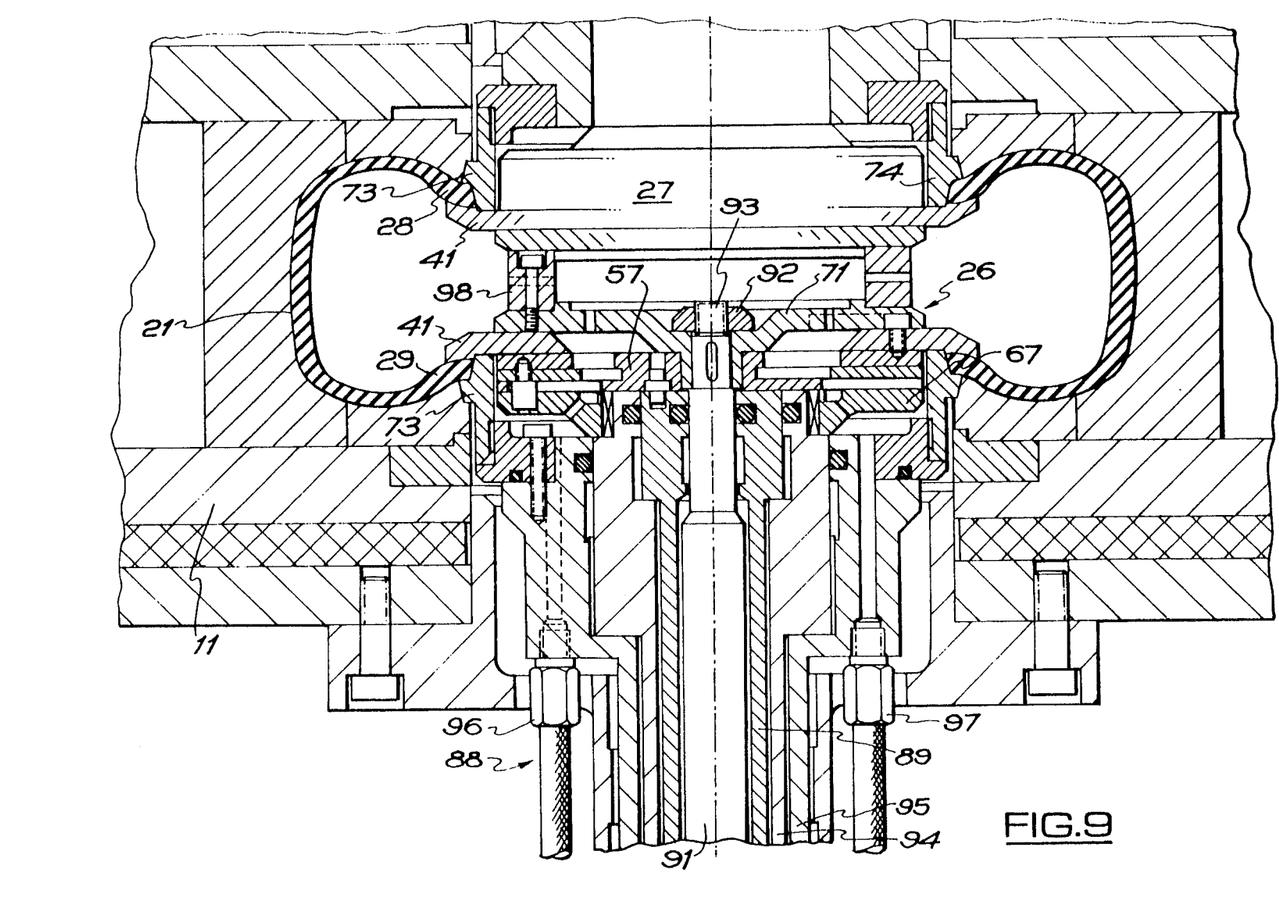
FIG. 9 shows a part vertical section showing the means for controlling the sectors of the sector plate.

It will be understood from the above description and in particular, from FIG. 9 that in the case of the upper sector plate, the upper side of the peripheral edge 46 of the upper sector plate 41 is used to mold the inside surface of the bead 28 and lower side of the peripheral edge of the lower sector plate 41 is utilized to mold the inside surface of the bead 29 of the tire 21. Thus, the diameter of the circle 44 is greater than the minimum diameter of the bead 28, 29. To reduce the effective diameter of the sector 42 from that shown in FIG. 3 to that shown in FIG. 4, it is necessary to move the sectors 42 and 43 inwardly with respect to the axis. This is done by rotating the cam plates 71 and 67. Rotation of the cam plate 71 will cause the cam followers 69 to move from the outermost end of the cam grooves 72 towards the innermost end thereby urging the cam followers 69 radially inwardly. This movement of cam followers 69 radially inwardly withdraws the sectors 43 inwardly away from the outer peripheral edge. The cam plate 67 may also be rotated to cause the cam followers 66 to move from the outermost end of the cam grooves 68 towards the inner most end of the cam grooves 68 and thereby move radially inwardly towards the axis, causing the sectors 42 to move radially inwardly. The sectors 42 and 43 may be withdrawn to the position shown in FIG. 4. During this inward movement of the sectors 42, 43, they are guided by engagement of the tongues 62 with the slot 59.

Figures 4, 5, 6:
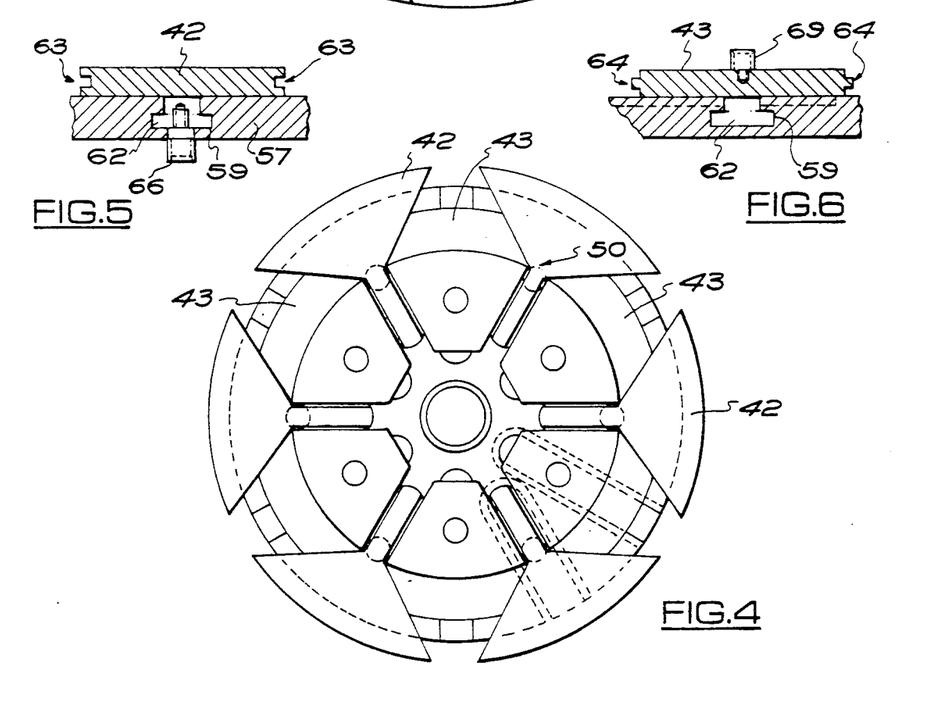
FIG. 4 shows a view similar to FIG. 3 of the sector plate with the sectors retracted.
FIG. 5 shows a vertical section on the line 5—5 of FIG. 3.
FIG. 6 shows a vertical section on the line 6—6 of FIG. 3.

In this way, the maximum outer diameter of the sector plate 41 in the position shown in FIG. 4 is less than the diameter of the bead.

Thus, when each sector plate 41 is in the configuration shown in FIG. 4, it may be inserted into the interior of the tire, then expanded to the configuration shown in FIG. 3 at which point the sectors 42, 43 can engage with the inside surface of the beads 28, 29. After curing, the sectors may be withdrawn so that the sector plate 41 takes the configuration shown in FIG. 4 and the sector plate 41 may be withdrawn from inside the cured tire.

Of course, the sectors 42, 43 only mold the interior surface of the beads 28, 29. The remaining surfaces of the beads 28, 29 are molded by means of the other annular bead molding part 38 of the center mechanism, and each may be provided, as is clear from FIG. 9, in the form of a cylindrical member 73, which may be movable axially into and out of engagement with its respective sector plate 41 when extended to the configuration of FIG. 3. The outer surface of each cylindrical member 73 adjacent its innermost edge may include a mold surface 74 which molds the edge and outer surfaces of the bead 28, 29.

We now refer in detail to FIG. 9. From FIGS. 1A and 9 it will be seen that the center mechanism 26 is mounted to the press frame 11 via the hydraulic rams 31 which extended downwardly from below the press frame 11 (the press frame 11 being mounted to the ground by means not shown) and from the lower end of the rams 31 there is provided an upwardly directed column 88. The column 88 mounts at its top end the center mechanism 26. The axial up and down movement is transmitted to the center mechanism 26 by means of a center shaft 91 and the lower end of the outer sleeve 95 acting against the bottom of the tubular shaft 94. The cam plate 71 is mounted by means of a nut 92 engaging a screw threaded upper end of the first shaft 91. The tubular member 89 is surrounded by a tubular shaft 94 which is connected at its upper end to the cam plate 67.

The center mechanism is operated by the shafts and sleeves which comprise column 88, as follows.

For the sequences of FIGS. 1B and 2D, the center mechanism is raised and lowered via the rams 31 acting on parts 91, 94 and 95, the bead clamping force being increased when the center shaft 91 pulls the top cam plate 71 against the bead ring 38 after this has registered in the bottom sidewall mold 23 (During press closing the center mechanism is forced down by the press rams 17 acting against the rams 31).

The sector plate 41 is expanded and retracted by rotation of the center shaft 91 and the tubular shaft 94, which causes rotation of the cam plates 67, 71 via the rotary actuator 31 and a suitable gear train (not shown). The relative rotary motion is such that the sectors 42, 43 move at differential speeds to their respective retracted and extended positions, and the edges 51, 52 remain in close proximity to edges 48, 49 and the tongues and grooves 63, 64 remain engaged to ensure that the sectors remain aligned with each other.

The inner sleeve 89 is splined at its lower end with outer sleeve 95 to prevent it from rotating and the mounting plate 57 is prevented from rotating by means of dowel pins projecting from the inner sleeve 89.

When the center mechanism is in the raised position, clearance will exist between the top cam plate 71, the bottom cam plate 67, and the mounting plate 57, so as to enable the cam plates to be rotated and for the sectors to be easily moved in and out.

On the bottom column the outer shaft 94 will drop so that it rests against the outer sleeve 95, whereas on the top column means will be provided to pull up the outer shaft 94 so that it presses up against the outer shaft 95.

This clearance is removed when the center mechanism is lowered into the mold as these parts are tightly clamped together due to the action of a buffer or springs.

Changing to a different bead diameter is achieved by simply removing the nut 93, on both the top and bottom center mechanisms, lifting out the following parts, and replacing them with parts appropriate to the required bead diameter.

Top cam plate 71.
Sector plate 41
Mounting plate 57.
Bottom cam plate 67.
Bead ring 73.
Spacer Ring 98 (Bottom Mechanism only).

Changing over to a different tire section (eg 145 155, 165, 245) may not require any changes at all, or may be restricted to the spacer ring 98, or to the sector plate 41, or to the bead ring 73 or to a combination of these.

Seals are provided at the top of shafts and sleeves 91, 89, 94, 95 to retain the curing and shaping medium within the inside of the tire.

The upper surface of the center mechanism 26 mounts an annular spacer ring 98 contacting the center mechanism 27 so as to restrain further movement of the two center mechanisms 26, 27 towards each other.

This annular spacer ring 98 also serves to transmit the full press closing force to form the tire bead shape during the final mold closing stages. Any excess material in the green tire beads 28, 29 or any protrusion above the bead ring 38 would in effect oppose the mold closing force and would become compressed or molded to shape, dependant upon its plasticity at this stage.

At the upper, head end of the column 88, there is provided a connection 96 for a hose for supplying the curing medium, and a connection 97 for exhaust of the curing medium.

The top and bottom center mechanisms and columns are generally similar except for:
  the spacer ring 98 attached to the bottom mechanism.
  the curing medium connections in the bottom column.
  the means to pull up the outer shaft 94 on the top column.

FIGS. 16A to 16D show in some more detail the operation of the press between the positions shown in FIGS. 1B and 1C. These details will now be understood having explained in detail the arrangement of the sector plates 41.

Figure 16A:
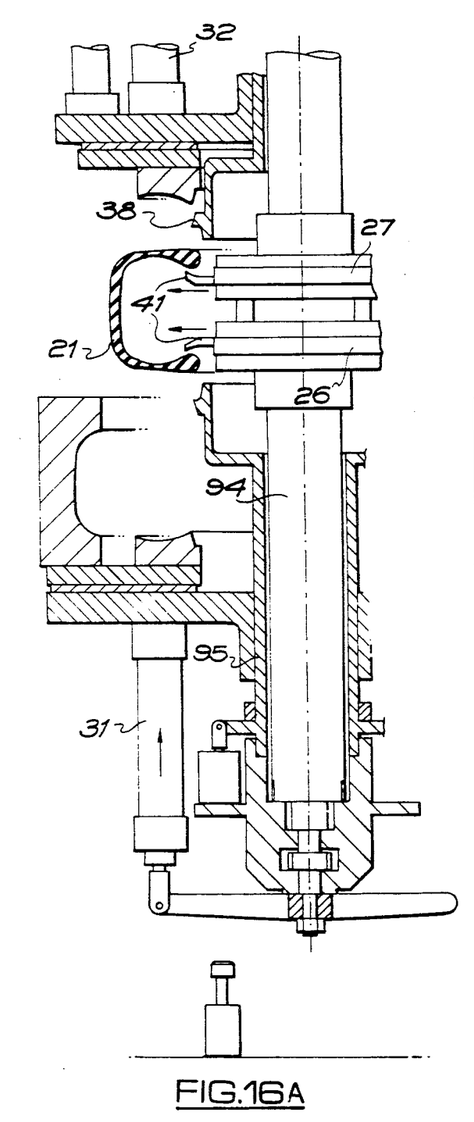
FIGS. 16A to 16D shows details of operation of the press between the stages of operation shown in FIGS. 1B and 1C.

Referring to FIG. 16A it will be seen that ram 31 is acting upwards to raise the center mechanism 26 and that the bead ring actuating ram is acting down to lower the bead ring.

Sleeve 94 has dropped slightly to rest on its bottom end and so provides clearance between the cam plates 67, 71 and the sector plate 41. The sector plate 41 is expanded into the green tire after it has been placed in position.

Figure 16B:
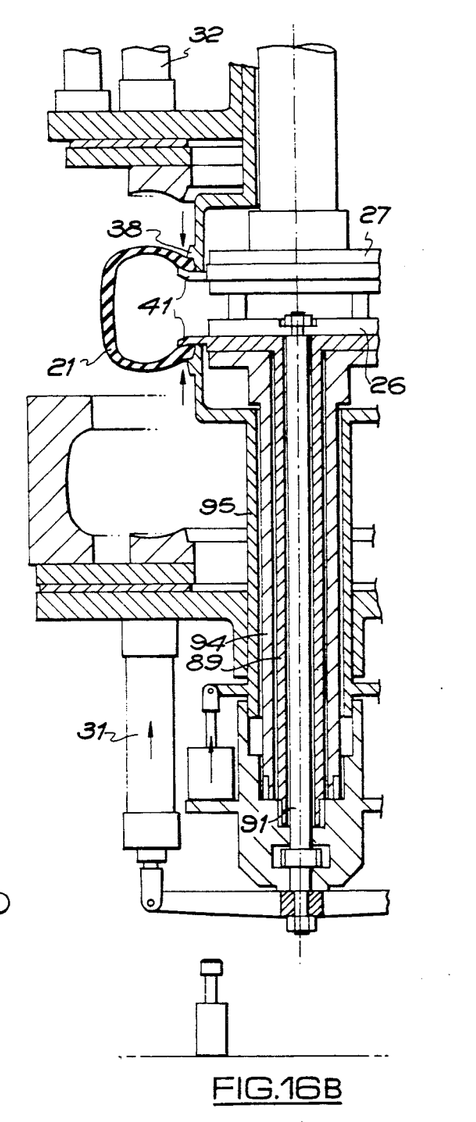

In this position, the parts 38 which are retracted are then moved towards one another and towards their respective sector plates 41. This is carried out by expansion of the bead actuating ram as shown in FIG. 16B. The initial movement is to clamp the beads 28, 29 of the tire 21 and in this position the parts 38 do not engage the sector plates 41, but are held apart by the beads which still have a high modulus at this stage (also refer to FIGS. 14A and 14B).

Figure 16C:
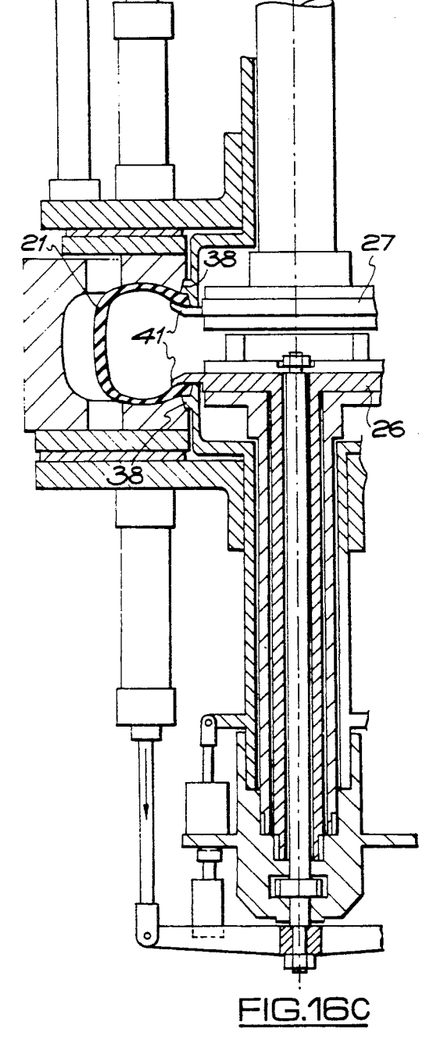

In FIG. 16C the bottom center mechanism has been moved down to its molding position and the top center mechanism to within 1 to 4 m.m of its fully closed position, as follows:

The press rams 17 act to force both the top and bottom center mechanism down until the bottom center mechanism registered in the bottom sidewall mold, the closing force being transmitted by the top ram 32 (outlet valve closed) pressing the top center mechanism 27 against the bottom central mechanism 26 via the spacer ring 98 the pressure in rams 31 being released as the bottom center mechanism decends. Pressure is then admitted to ram 31 causing it to expand so as to increase the clamping pressure on the green tire bottom bead by pulling the sector plate 41 against the bead ring 38.

Immediately prior to this the outlet sleeve 95 will have contacted a buffer causing the bead sector plate 41 to be tightly clamped between the cam plates 67, 71.

Simultaneously the pressure inside the rams 32 will be released to enable the top platen 12 to decend to within 1 to 4 mm of its fully closed position, and which will also bring a buffer into contact with the outer sleeve 95 of the top column 88. (This can be seen more clearly by reference to FIGS. 1C and 1D.)

Pressure is then admitted to expand rams 32 so raising the top center mechanism until the bead ring 38 becomes registered in the to sidewall mold 22. This will further increase the compression on the buffer so as to tightly clamp the upper bead sector plate 41 between the cam plates 67, 71.

The upward pressure in rams 32 will also increase the clamping force on the green tire top bead, after the bead ring has registered in the mold and cause the top center mechanism 27 to separate slightly from the spacer ring 98.

Figure 16D:
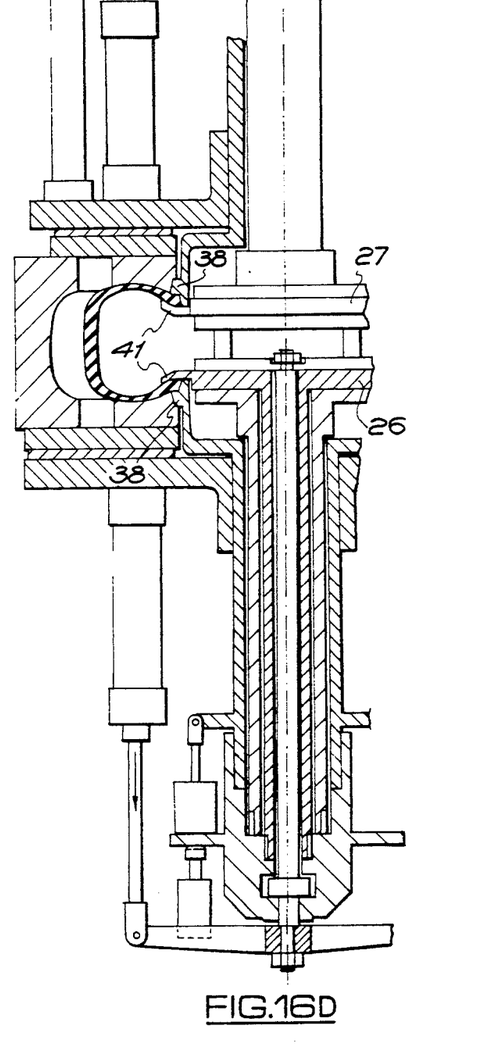

In FIG. 16D the press rams 17 lowers top platen 12 preferably to within less than 1 mm of its fully closed position, after which the tread sectors 36 may be advanced to form a continuous tread ring.

The top platen is then lowered to contact the tread sectors and the full press closing force applied. This force will also be applied from the top side wall mold to the bottom sidewall mold through the bead rings, bead sector plates, top cam plates and the spacer ring, and will ensure that any gap between the spacer ring and the top mechanism is eliminated. Any protrusion of the green tire beads will at this stage be subjected to the full press closing force, and the sector plate 41 will become fully engaged with bead ring 38.

Figure 10:
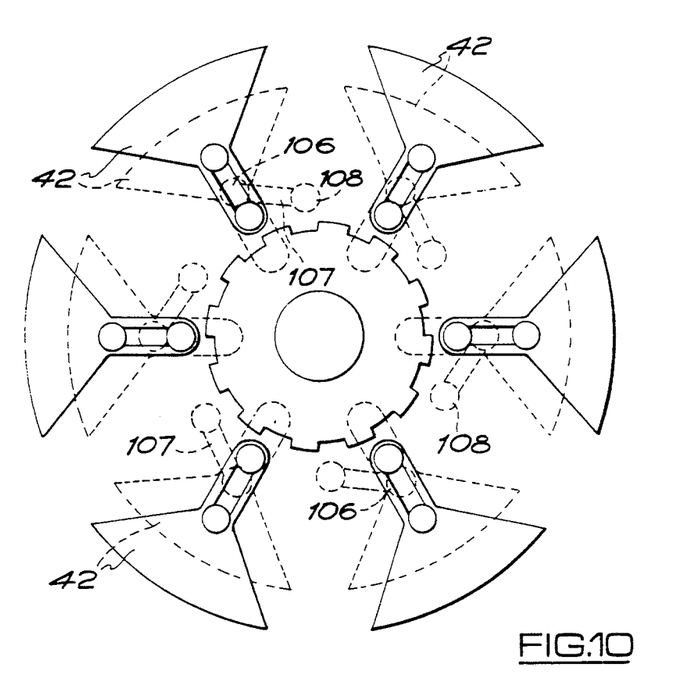
FIG. 10 shows a plan view of an alternative mechanism for operating one of the set of sectors of the sector plate shown in FIGS. 3 and 4.
Figure 11:
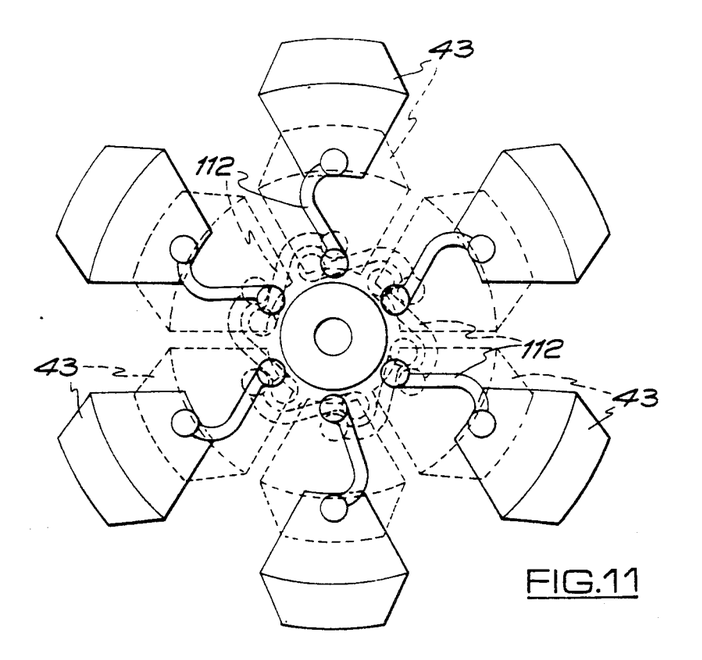
FIG. 11 shows a plan view of an alternative arrangement of an apparatus for operating the other set of sectors of the sector plate shown in FIGS. 3 and 4.
Figure 12:
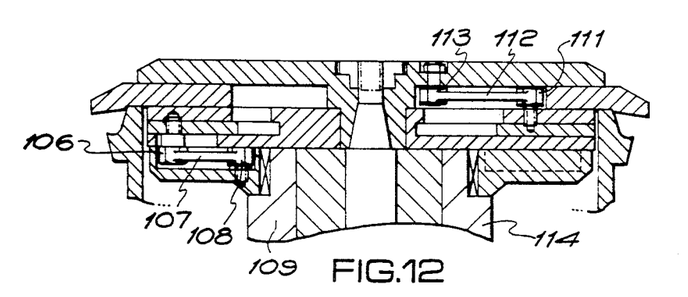
FIG. 12 is a vertical section through the arrangement of FIG. 10 (to the left of the axis) and FIG. 11 (to the right of the axis)

FIGS. 10, 11 and 12 show an alternative arrangement for moving the sectors 42, 43. We refer firstly to FIG. 10 and the left hand half of FIG. 12 which shows the mechanism for moving the sectors 42. In place of the cam follower 66 and cam plate 67 there is provided a downwardly extending pin 106 from each sector 42, a link 107 extending horizontally from the pin 106 to a further pin 108 mounted to a cylindrical member 109.

Rotation of the cylindrical member 109 causes the links 107 to move from their solid line position shown in FIG. 10 to the dotted line position, and hence tends to move the pins 106 inwardly thereby moving the corresponding sectors 42 inwardly.

A somewhat similar arrangement is provided for the sectors 43 including pins 111 corresponding to the pins 106, links 112 corresponding links 107 and pins 113 corresponding to pins 108. A cylindrical member 114 is provided corresponding to cylindrical member 109. Because the sectors 43 have to move in further than the sectors 42, the link 112 has to be of the shape shown so as to nestle with the other links when the sectors 43 are in the dotted position.

Figure 14A:
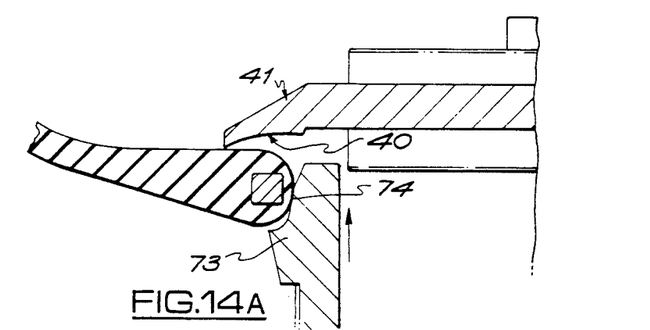
FIGS. 14A to 14C show the bead of a tire and the bead forming part of the tire press during operation of the tire press.
Figure 14B:
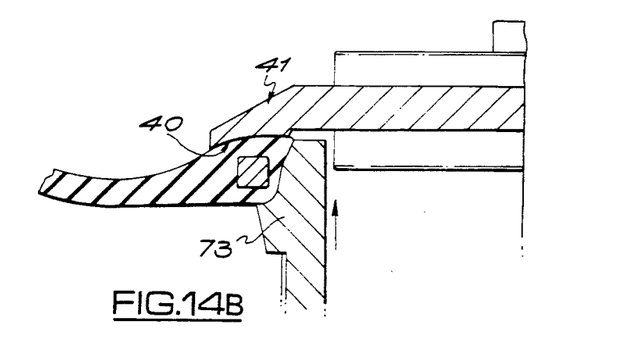
Figure 14C:
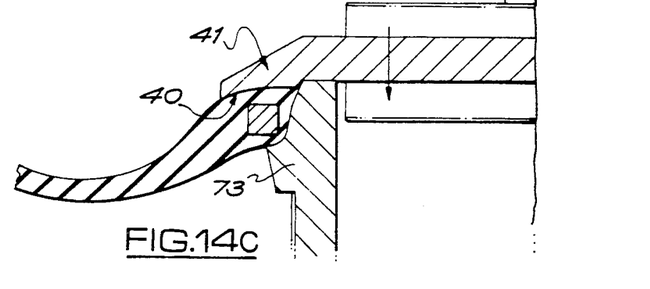

Referring to FIGS. 14A to 14C, it will be seen that FIG. 14A shows the cylindrical bead ring 73 moving into engagement with the bead 28 of the green tire and with the lower sector plate 41 when in its extended position. The initial movement of the cylindrical bead ring 73 clamps the bead between the cylindrical bead ring 73 and the mold surface 40 of the sector plate 41, see FIG. 14B.

In this initial clamping position both tire beads are accurately located on their respective bead rings and sufficient clamping pressure applied to enable low inflation or shaping pressure to be admitted to shape the green tire and tension the ply cords of the tire (in the position shown in FIG. 1B). After the center mechanisms and the green tire have been properly inserted into the remainder of the mold (as in FIG. 1C, 14C and 16C) the downward pressure on the sector plate 41 is greatly increased by the rams 31, 32 so as to further shape the beads, and this enables the internal shaping pressure to be increased if this is required. At this stage the top and bottom center mechanisms are held slightly wider apart than the fully closed position as to enable the tread sectors 36 to be moved to form a complete mold tread ring. The press is then fully closed and the closing pressure transmitted to the sector plates 41 in order to fully compress the green tire beads, after which the curing medium is admitted (as in FIG. 1D and 16D).

Figure 13A:
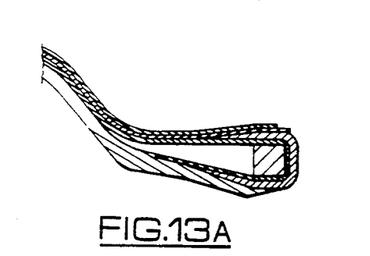
FIGS. 13A to 13C show different constructions of cross section of the bead of a green tire.
Figure 13B:
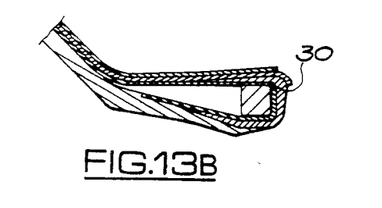
Figure 13C:
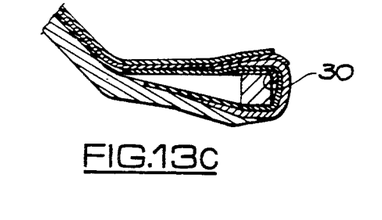

FIGS. 13A to 13C show various construction arrangements of beads 28, 29 of green tires which may usefully be used with the arrangement of sector plates 41 and cylindrical bead ring 73 as described. FIG. 13A is a conventional construction. In FIG. 13B, the thickness of the material in the toe region 30 is increased by extending one of the inner liners into the toe region, and in FIG. 13C, this thickness is further increased by adding a packing strip between the bead ring itself and the toe 30 of the bead.

The mold surface 40 of each sector plate 41 has hitherto been described as a simple shaped area of generally conventional shape. Other arrangements may be utilized in order to enhance the seal between the tire bead and the mold, either by virtue of the sector shape or by means of maintaining pressure on the tire bead independent of the curing medium pressure and of the initial compression forces required to form the bead shape. This applies particularly during the period when the polymer in the green tire becomes plasticised and before cross linking of the polymer (curing) is completed.

Figure 15A:
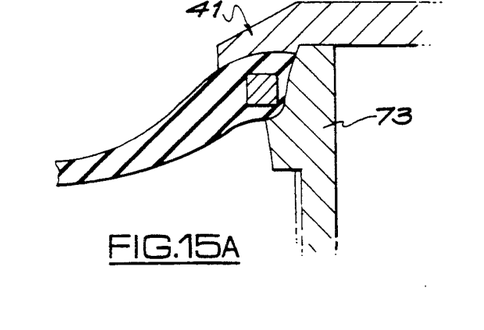
FIGS. 15A to 15J show cross sections of different arrangements of edges of the sectors.
Figure 15B:
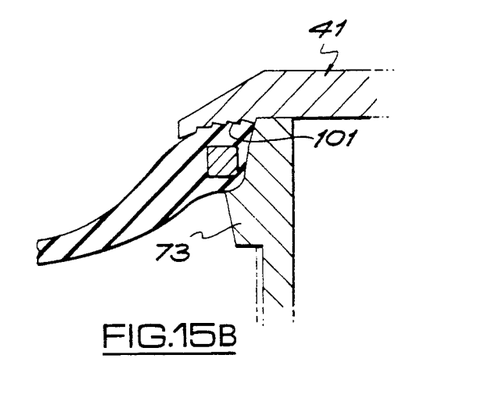
Figure 15C:
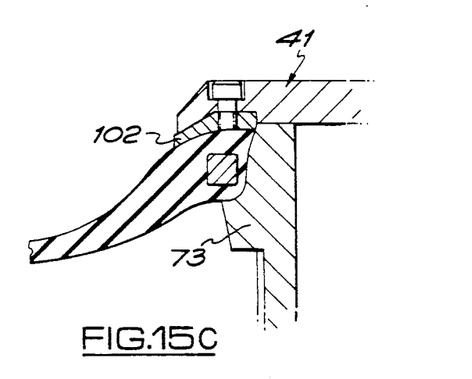
Figure 15D:
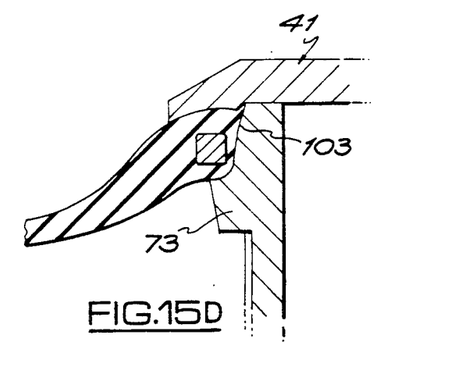

FIG. 15A shows a conventional arrangement similar to that already described. In FIG. 15B, the mold surface 40 includes serrations 101 which restrict the flow of material in the bead away from the toe during molding. In FIG. 15C, the mold surface 40 is provided by a replaceable profiled pad 102 so that different profiles may be used for, for example, different tires. In FIG. 15D, a profile is provided in which adjacent the toe of the bead, there is provided a slot 103 between the mold surfaces 40 and 74 into which material from the bead 28, 29 may flow to produce a lip seal around the bead toe of the cured tire.

Figure 15E:
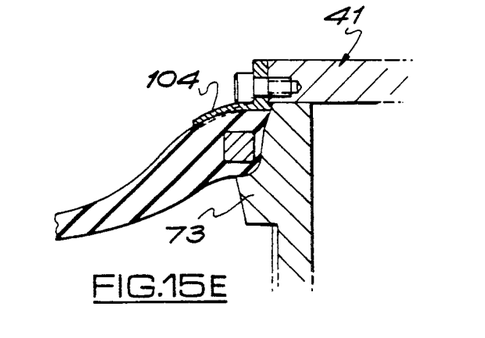

In FIG. 15E the mold surface 74 is provided by a spring steel strip 104 mounted to the outer periphery of the sector plate 41, to improve sealing with the bead 28, 29, by applying a pressure thereto. This will maintain pressure on the tire bead even if the amount of material is insufficient to obtain a seal with an otherwise non-flexible surface. In order to avoid producing a step at the outer edge of the sector plate this may be slit at intervals so as to reduce the edge pressure on the green tire, or the outer edge may be curved up.

Figure 15F:
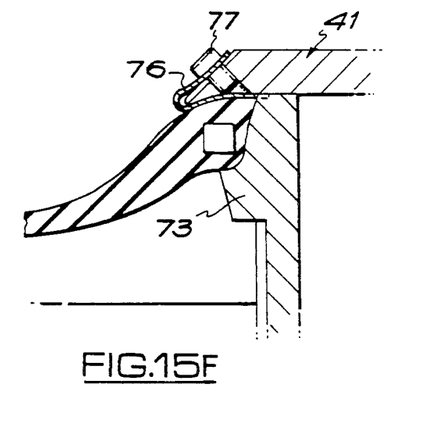
Figure 15G:
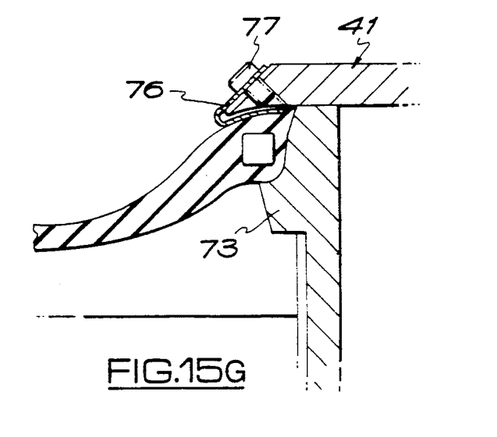
Figure 15H:
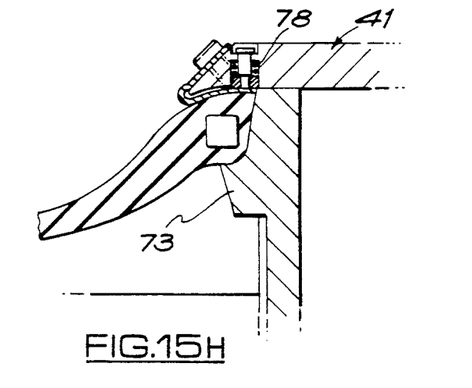

In FIG. 15F and 15G the mold surface 74 is provided by a spring plate 76 as illustrated, FIG. 15F illustrating the position of the spring plate 76 at the beginning of the curing process, and FIG. 15G showing the position of the spring plate 76 at the mid point of the curing process. Any lack of pressure on the bead 28, 29 due to insufficient material, or to the increase in plasticity, is taken up by movement of the spring plate 76, away from the sector plate 41. The spring plate 76 is mounted by a screw 77 to the outer surface, of the sector plate 41. In an alternative design in FIG. 15H an arcuate bar is provided at the bead toe position urged down by multiple springs 78 in order to increase the sealing pressure at this critical position. The springs 78 will be arranged in an arc above the arcuate bar.

Figure 15I:
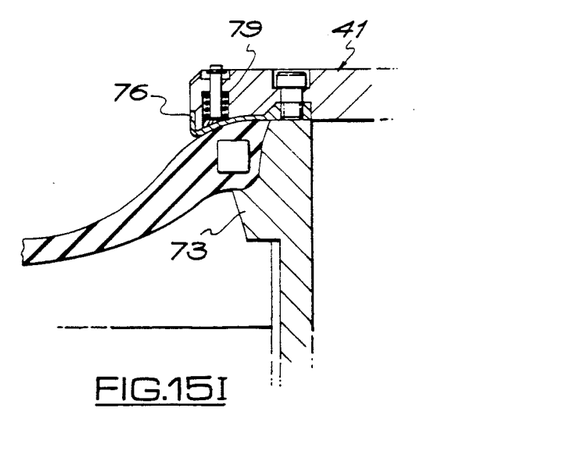
Figure 15J:
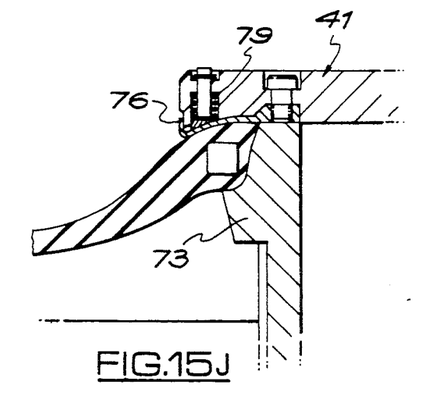

Further arrangement of spring plate 76 is shown in FIGS. 15I and 15J, FIG. 15I showing the alternative arrangement at the beginning of the cure and FIG. 15J the same arrangement partway through the cure. In this case, the spring plate 76 is urged downwardly into engagement with the bead by means of a plurality of spring 79.

The principle benefit of the arrangements of FIG. 15 F/G/H/I/J is that the spring plates can be forced back against the solid sector plate during the green tire bead clamping and forming operations, thus allowing the full press closing force to be absorbed by the solid part of the sector.

However, the internal forces generated within the tire bead when this is compressed will become dissipative as the plasticity increases and material flow takes place. The bead of course will be subjected to the curing medium inflation pressure but this will not have any effect on shaping the inside bead profile, and in particular the bead toe.

The spring plates are free at this stage to open or expand and maintain pressure on the tire beads independent of the press closing forces and curing pressure and so influence the inside bead shape and in particular in forming the bead toe and in ensuring that an effective seal is obtained at this critical point.

These spring plates will also function if the volume of material in the green tire bead is slightly less than the equivalent mold volume.

It is however, preferable that the volume of material in the green tire bead should be slightly in excess of the mold volume as the compressive forces generated will assist in molding the bead shape, any excess material will flow outward on either side of the bead core.

The action of the spring plates will be to influence the flow of material towards the bead toe and to maintain or increase the sealing pressure at this point.

When the cross linking of the polymers is completed, the tire bead will become self sealing, in much the same manner in which it functions as a finished tire on a vehicle wheel.

The invention is not restricted to the details of the foregoing example. Many alternatives have been given, but it will be understood that there has been described an efficient bladderless tire mold press.

I claim:

1. A bladderless tire mold press for tires comprising:
lower and upper platens;
means for moving each of the lower and upper platens relatively toward one another from an open position to a closed molding position;
first means for molding the tire side walls;
second means for molding the tire tread;
first tire bead molding means for engaging the outside of a respective tire bead; and
second tire bead molding means for engaging the inside of said respective tire bead; and
said second tire bead molding means comprising:
movable central means for engaging said inside of said respective tire bead; and
means for moving said central means relative to the platens so as to insert said central means into the center of the tire for permitting the engagement of the central means with said inside of said respective tire bead; wherein:
said first and second tire bead molding means are relatively movable with respect to said first means for molding the tire side walls and said second means for molding the tire tread in a direction toward said respective tire bead and away from said respective tire bead; and
said means for moving said central means moves said central means into the center of said tire independently of the movement of the first tire bead molding means.

2. A press according to claim 1 wherein the respective central means are each expandable from a retracted state to an expanded state.

3. A press according to claim 2, wherein the respective central means each comprises a plurality of sectors which, in an expanded state, engage with one another to provide a molding surface for molding the inside surface of the tire bead.

4. A press according to claim 3, wherein the sectors comprise a first outer set and a second inner set, the sectors from the two sets being arranged alternately and the peripheral edges of the sectors forming a circle in the expanded state.

5. A press according to claim 4, wherein the sectors of the respective sets are radially moveable between their retracted state and their expanded state in response to the rotation of respective cam plates, each sector having an associated cam follower engageable with the respective cam plate.

* * * * *